United States Patent Office 2,846,352
Patented Aug. 5, 1958

2,846,352

VITAMIN COMPOSITIONS AND METHOD FOR PRODUCING THE SAME

Charles C. Bryant, Grosse Pointe Woods, Mich., assignor to Parke, Davis & Company, Detroit, Mich., a corporation of Michigan No Drawing. Application December 10, 1953
Serial No. 397,463

21 Claims. (Cl. 167—81)

This invention relates to aqueous vitamin compositions containing vitamin $B_{12}$ and to a method for producing the same. More particularly, the invention relates to aqueous vitamin compositions suitable for oral administration which contain therapeutic amounts of vitamin $B_{12}$ and vitamin C.

Vitamin $B_{12}$ is an important hemopoietic agent used in the treatment of pernicious anemia. Like many other vitamins a supply of this vitamin appears to be essential to the maintainance of good health in both humans and animals. In many instances ample amounts of the vitamins are obtained in the diet. However, due to the poor dietary habits, idiosyncrasies, physical conditions, etc. of many people and animals, many times it is necessary or advisable to supplement the vitamin intake by administration of the pure vitamins. In most adults or certain animals this can be done by orally administering capsules or tablets containing a dry mixture of the vitamins. In children and those patients and animals who are unable to swallow capsules or tablets, it is customary to provide the vitamins in the form of an aqueous solution or dispersion.

Since most vitamin deficiencies are attributable to the lack of several other vitamins rather than to the lack of any one vitamin, multiple vitamin therapy is of great importance. Infant growth also is much more rapid when a mixture of the vitamins is administered. As mentioned above, in many instances it is necessary or desirable to administer such vitamin mixtures in the form of an aqueous solution or dispersion. Unfortunately vitamin $B_{12}$ presents a peculiar problem in this respect since it is very unstable in aqueous solutions containing vitamin C. Although the inactivation of vitamin $B_{12}$ by vitamin C is for some as yet unexplained reason lessened somewhat by the presence of other vitamins, the rate, particularly the initial rate, and extent of the vitamin $B_{12}$ destruction is so great that it has not been possible to produce aqueous multi-vitamin solutions containing vitamin $B_{12}$ and vitamin C which are sufficiently stable to permit their sale as articles of commerce.

It is an object of this invention to provide aqueous vitamin dispersions, suitable for oral administration, containing vitamin $B_{12}$ and vitamin C together with certain of the other B vitamins and/or vitamins A and D, which are sufficiently stable under the conditions and periods of storage normally encountered in the pharmaceutical industry to permit their sale as articles of commerce.

In accordance with the present invention, aqueous vitamin dispersions suitable for oral administration containing vitamin $B_{12}$ and vitamin C together with certain of the other B vitamins and/or vitamins A and D, in which the vitamin $B_{12}$ is sufficiently stable to permit the sale of these products as articles of commerce, are produced by incorporating a water-swellable clay of the Montmorillonite type in an aqueous vitamin solution containing in addition to vitamin $B_{12}$ and vitamin C certain of the other B vitamins and/or vitamins A and D. The amount of the water-swellable clay is, of course, dependent somewhat upon the concentration of the vitamin $B_{12}$ to be stabilized and the amount of vitamin C present in the solution. However, in general, a concentration of 4 to 30 mg. per ml. of the water-swellable clay is sufficient to stabilize therapeutic amounts of vitamin $B_{12}$ even in the presence of large quantities of vitamin C. For example, the aforementioned concentrations of the water-swellable clay are sufficient to stabilize concentrations of vitamin $B_{12}$ between about 0.2 and $25\gamma$ per ml. in the presence of approximately one to three thousand times the concentration (6 to 32.5 mg. per ml.) of vitamin C. Such aqueous dispersions retain a large percentage of their original vitamin $B_{12}$ potency even after storage for one year at room temperature. In contrast to this, similar solutions which contain no water-swellable clay lose all or most of their vitamin $B_{12}$ potency under these conditions.

The water-swellable Montmorillonite clays which can be used in the practice of the invention include montmorillonite, beidellite, nontronite, hectorite, saponite, and sauconite. Chemically these clays are water-swellable hydrated silicates of aluminum, calcium and magnesium or hydrated complexes of these silicates. These clays occur quite widely in nature, and in most instances they are associated with many other mineral products. It is therefore usually desirable to purify the clays somewhat before using them in the practice of the invention. For example, where the water-swellable hydrous calcium, magnesium, aluminum silicates, which occur in bentonite, are used, it is important to separate and discard the gritty material with which such silicates are usually associated. This separation may be readily obtained by centrifuging a slurry or suspension of bentonite in water, containing from 4 to 15% or more solids to a centrifugal force ranging from about 400 to 1500 or more times the force of gravity. Where the water-swellable aluminum silicates used occur naturally in a mixture with carbonates, it may be desirable to separate the carbonates from the silicates by washing with a mineral acid. It is important and advantageous to use a water-swellable aluminum silicate of a light color. Some aluminum silicates derived from available sources are not well suited for use in accordance with the present invention because of their dark color; this is an aesthetic reason alone.

A number of suitable water-swellable clays are now available commercially in purified form. For example, the purified clay sold by the R. T. Vanderbilt Company under the trade name of "Veegum" or the purified clay sold by the National Lead Company under the trade name of "Dutch Boy Thix" can be used in the practice of the invention. "Veegum" is a hydrated complex calcium, magnesium, aluminum silicate prepared from bentonite in the manner described above. The average chemical analysis of "Veegum," conventionally expressed as oxides, is as follows:

| | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

"Dutch Boy Thix" is a highly purified magnesium montmorillonite, probably a hectorite, which has an average chemical analysis on a dry basis, expressed as oxides, as follows:

| | Percent |
|---|---|
| Silicon dioxide | 56.5 |
| Aluminum oxide | 0.2 |
| Ferric oxide | 0.2 |
| Magnesium oxide | 25.8 |
| Calcium oxide | 2.8 |
| Sodium oxide | 2.5 |
| Potassium oxide | 0.1 |
| Lithium oxide | 1.1 |
| Chloride | 2.5 |
| Fluoride | 1.0 |

Since the water-swellable clays are insoluble in water it is, of course, important to only use finely divided material in the preparation of the vitamin dispersions of the invention. Although the particle size is not, so far as I have been able to ascertain, very critical, the particles should be small enough to suspend in the solution without difficulty and remain suspended for at least several days. In this connection it is usually advantageous to add a small amount of another suspending agent such as sodium carboxymethyl cellulose to the dispersion to aid in obtaining a uniform and more lasting dispersion of the clay. When using sodium carboxymethyl cellulose as a suspending agent, concentrations of from 10 to 15 milligrams per milliliter are usually sufficient to attain the desired result with the amount of the clays normally employed.

As mentioned above, the concentration of the water-swellable clay in the final vitamin preparations should be between about 4 to 30 milligrams per milliliter. Concentrations much below 4 milligrams per milliliter are not sufficient to stabilize any therapeutically useful amounts of vitamin $B_{12}$ while concentrations above 30 milligrams per milliliter tend to unduly increase the viscosity of the final preparation beyond that which is usually desirable in an aqueous vitamin preparation. The optimum concentration of the water-swellable clay depends somewhat on the clay employed, its particle size, amount of vitamin $B_{12}$ to be stabilized, amount of vitamin C in the solution, etc. but it is usually in the neighborhood of 5 to 8 milligrams per milliliter. The optimum vitamin $B_{12}$ concentration in the preparations of the invention is about 0.2 to $4\gamma$ per milliliter while the optimum vitamin C concentration is from 6 to 20 milligrams per milliliter.

In addition to vitamin $B_{12}$ and vitamin C the aqueous vitamin preparations of the invention also contain certain of the other B vitamins and/or vitamins A and D. When the aqueous vitamin preparations contain vitamins A and D these water insoluble vitamins must, of course, be "solubilized." This can be done for example by the methods described and claimed in United States Patent No. 2,417,299 or United States Patent No. 2,541,285. The concentrations of the vitamins A and D in the preparations of the invention which contain these two vitamins are not particularly critical and can be varied from about 500 to about 4000 units per milliliter in the case of vitamin A and from about 100 to 6000 units per milliliter in the case of vitamin D. The vitamins A and D used in the production of these dispersions can be in any of the commercially available forms. For example, the vitamin A may be in the form of a highly concentrated fish liver oil distillate or in the form of a synthetic fatty acid ester of vitamin A such as the palmitate ester of vitamin A alcohol.

The vitamin dispersions of the invention which do not contain vitamins A and D must contain thiamine and riboflavin. However, as in the case of vitamins A and D, the concentration and form of these B vitamins can be varied. The concentration of the thiamine can be varied from 0.2 to 2.5 milligrams per milliliter while the concentration of the riboflavin can be varied from 0.2 to 2.0 milligrams per milliliter. Any commercially available form of these vitamins may be employed. For example, thiamine may be employed in the form of its hydrochloride or mono-nitrate salts while riboflavin can be employed per se or as the sodium phosphate salt or as the monodiethanolamine salt. For simplicity in both the claims and description which follow the terms vitamin A, vitamin D, thiamine, riboflavin, pyridoxine and pantothenic acid will be used, in the absence of a designation to the contrary, as meaning the aforementioned vitamins per se or a salt or derivative thereof having the therapeutic efficacy of the vitamin per se.

The vitamin $B_{12}$-vitamin C preparations of the invention which contain vitamins A and D and/or thiamine and riboflavin can also contain, as optional components, other vitamins, flavoring agents and preservatives. For example, they may contain other B vitamins such as nicotinamide, pyridoxine (usually as an acid addition salt) and pantothenic acid (usually as an alkali or alkaline earth metal salt or a derivative such as pantothenol). The concentrations of these B vitamins can vary from 0 to 12 milligrams per milliliter in the case of nicotinamide, from 0 to 0.6 milligrams per milliliter in the case of pyridoxine and from 0 to 3 milligrams per milliliter in the case of pantothenic acid. Other vitamins such as vitamin K and vitamin E can also be added to the dispersions of the invention.

As flavoring agents oil of orange, sucrose, glucose, saccharin and the like can be used. Concentrations of from about 5 to 20% can be used in the cases of sucrose and glucose; 0.1 to 0.3% by volume in the case of oil of orange and 0.01 to 0.5% in the case of saccharin (as the sodium salt). As a preservative, sodium benzoate may be used in concentrations varying from about 0.3 to 0.7%.

The preferred preparations of the invention are those which contain vitamin $B_{12}$, vitamin C, vitamin A, vitamin D, thiamine and riboflavin with or without one or more of the optional vitamin components mentioned above. The optional and permissible concentrations of the vitamins and water-swellable clay in such preferred preparations are as follows:

| | Optimal concentration per milliliter | Permissible concentration per milliliter |
|---|---|---|
| Vitamin $B_{12}$ _____ | 0.2 to $4.0\gamma$ | 0.2 to $25\gamma$ |
| Vitamin C _____ mg | 6 to 20 | 6 to 32.5 |
| Vitamin A _____ units | 600 to 2,000 | 500 to 4,000 |
| Vitamin D _____ do | 150 to 350 | 100 to 6,000 |
| Thiamine _____ mg | 0.2 to 1.5 | 0.2 to 2.5 |
| Riboflavin _____ mg | 0.2 to 1.5 | 0.2 to 2.0 |
| Water-swellable Montmorillonite clay mg | 5 to 8 | 4 to 30 |

The above preferred preparations containing the optimum concentrations of the vitamins and water-swellable clay are particularly useful in pediatrics. Preparations which also contain nicotinamide, pantothenic acid and pyridoxine are even more valuable in this respect since such dispersions contain all of the vitamins considered to be of importance to the growth and health of infants and small children.

The products of the invention are prepared by mixing an aqueous solution containing the vitamin $B_{12}$ with a dispersion of the water-swellable clay in an aqueous solution containing vitamin C and other vitamins. It is, of course, possible to interchange the vitamin C and the vitamin $B_{12}$, that is, to incorporate the vitamin $B_{12}$ in the dispersion with the water-swellable clay and other vitamins and to mix this dispersion with an aqueous solution of vitamin C. In this latter instance, the pH of the solution containing the water-swellable clay and other vitamins should be adjusted to between about 6 and 7 in order to eliminate any unnecessary destruction of the vitamin $B_{12}$ due to the alkalinity of the solution. Since many of the vitamins are very susceptible to oxidation, it is preferable to carry out the mixing and packaging of the aqueous preparations in an inert atmosphere such as under nitrogen gas. For maximum vitamin stability the final pH of the preparations of the invention should be between 4.7 and 6.

The invention is illustrated by the following examples.

*Example 1*

An aqueous solution composed of 307.58 g. of vitamin C, 21.29 g. of thiamine hydrochloride, 108.84 g. of nicotinamide, 5.44 g. of pyridoxine hydrochloride, 35.49 g. of sodium d-pantothenate, 23.09 g. of riboflavin-5'-phosphate ester monosodium salt dihydrate (70.9% of which is riboflavin), 5.678 g. of sodium saccharin, 94.64 g. of sodium benzoate and 53.755 g. of sodium hydroxide in 1750 ml. of distilled water is added under an atmosphere of nitrogen gas with stirring to an aqueous dispersion containing 113.57 g. of purified water-swellable hydrous magnesium-calcium-aluminum-silicate (Veegum), 212.10 g. of sodium carboxymethyl cellulose and 3786 g. of sucrose in 11 liters of distilled water. (The latter dispersion is prepared by stirring the "Veegum" with the water at 38° to 50° C. until it is hydrated, about one-half hour, and then dissolving the sodium carboxymethyl cellulose and sucrose in the resultant dispersion.)

31,941,000 units of synthetic vitamin A palmitate, 5,441,800 units of vitamin D (irradiated ergosterol in corn oil) and 24.6 ml. of oil of orange are dissolved in 283.92 g. of the monostearate ester of a polyethylene glycol having an average molecular weight of about 1000 keeping the temperature in the neighborhood of 45–50° C. The solution of the vitamins A and D in the monostearate ester of the polyethylene glycol is added gradually with stirring to 2700 ml. of distilled water at 40° C. The clear solution is then added with stirring in a nitrogen atmosphere to the aqueous dispersion containing the vitamin C and other water soluble vitamins. 0.0408 g. of vitamin $B_{12}$ having a purity of 87% dissolved in 75 ml. of distilled water is added to the dispersion with stirring under nitrogen and the resultant dispersion diluted with distilled water to a volume of 18,928 ml. to obtain the desired multivitamin solution. The pH of the final preparation is 5.08. Each milliliter of this final preparation has the following calculated composition:

| | | |
|---|---|---|
| Vitamin $B_{12}$ | | 1.84γ |
| Vitamin C | mg | 16.25 |
| Water-swellable montmorillonite clay | mg | 6.0 |
| Vitamin A (palmitate ester) | units | 1687 |
| Vitamin D (irradiated ergosterol) | do | 288 |
| Thiamine hydrochloride | mg | 1.12 |
| Riboflavin phosphate monosodium salt dihydrate | mg | 1.22 |
| Nicotinamide | mg | 5.75 |
| Pyridoxine hydrochloride | mg | 0.29 |
| Sodium d-pantothenate | mg | 1.88 |

The final preparation is bottled under nitrogen and the bottles sealed. The yield is about 40 pints of the desired multivitamin dispersion.

To test the stability of the vitamin $B_{12}$ in the above preparation a bottled sample is heated at 45° C. for 500 hours and then its vitamin $B_{12}$ content determined by the standard microbiological method described on pages 15 to 20 of the third supplement to volume XIV of the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period 1.55γ of vitamin $B_{12}$ per milliliter. The destruction of the vitamin $B_{12}$ was therefore 0.29γ per milliliter or 15.8%. In contrast to this, the control solution, that is an aqueous multi-vitamin identical in all respects to the above described preparation but containing no water-swellable Montmorillonite clay, lost 71.3% of its vitamin $B_{12}$ content under the same test conditions.

*Example 2*

An aqueous solution composed of 8.9 g. of vitamin C, 563 mg. of thiamine hydrochloride, 2.88 g. of nicotinamide, 430 mg. of riboflavin-5'-phosphate ester monosodium salt dihydrate, 140 mg. of pyridoxine hydrochloride, 937 mg. of sodium d-pantothenate, 0.15 g. of sodium saccharin, 5 g. of sodium benzoate and 1.56 g. of sodium hydroxide in 105 ml. of distilled water is added under an atmosphere of nitrogen gas with stirring to an aqueous dispersion containing 6 g. of purified water-swellable hydrous magnesium-calcium-aluminum-silicate (Veegum), 11.22 g. of sodium carboxymethyl cellulose and 100 g. of sucrose in 580 ml. of distilled water. (The latter dispersion is prepared by stirring the "Veegum" with the water at 50° C. until it is hydrated, about one-half hour, and then dissolving the sodium carboxymethyl cellulose and sucrose in the resultant dispersion.)

845,000 units of synthetic vitamin A palmitate are dissolved in 7.5 g. of the monostearate ester of a polyethylene glycol having an average molecular weight of about 1000 keeping the temperature at about 45° C. 145 ml. of distilled water at 40° C. is added gradually with stirring to the vitamin A solution. The resultant clear aqueous solution is then added with stirring in a nitrogen atmosphere to the aqueous dispersion containing the vitamin C and other water-soluble vitamins. 940γ of crystalline vitamin $B_{12}$ dissolved in 4 ml. of distilled water is added to the dispersion with stirring under nitrogen and the resultant dispersion diluted with distilled water to a volume of 1000 ml. The product is then passed through a homogenizer at 500 pounds per square inch pressure and bottled in an atmosphere of nitrogen. The pH of the final preparation is about 5.1. Each milliliter of this final preparation has the following calculated composition:

| | | |
|---|---|---|
| Vitamin $B_{12}$ | | 0.94γ |
| Vitamin C | mg | 8.9 |
| Water-swellable montmorillonite clay | mg | 6.0 |
| Vitamin A (palmitate ester) | units | 845 |
| Thiamine hydrochloride | mg | 0.563 |
| Riboflavin phosphate monosodium salt dihydrate | mg | 0.43 |
| Nicotinamide | mg | 2.88 |
| Pyridoxine hydrochloride | mg | 0.14 |
| Sodium d-pantothenate | mg | 0.937 |

To test the stability of the vitamin $B_{12}$ in the above preparation a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period 0.9γ of vitamin $B_{12}$ per milliliter. The destruction of the vitamin $B_{12}$ was therefore 0.04γ per milliliter or about 4.3%. This amount of destruction is well within the experimental error of the assay procedure and it is therefore evident that the vitamin $B_{12}$ in the solution was completely stable.

*Example 3*

An aqueous solution composed of 32.5 g. of vitamin C, 2.25 g. of thiamine hydrochloride, 11.5 g. of nicotinamide, 1.73 g. of riboflavin-5'-phosphate ester monosodium salt dihydrate, 576 mg. of pyridoxine hydrochloride, 3.7 g. of sodium d-pantothenate, 0.6 g. of sodium saccharin, 5 g. of sodium benzoate and 5.7 g. of sodium hydroxide in 105 ml. of distilled water is added under an atmosphere of nitrogen gas with stirring to an aqueous dispersion containing 6.9 g. of purified water-swellable hydrous magnesium-calcium-aluminum-silicate (Veegum), 11.22 g. of sodium carboxymethyl cellulose and 200 g. of sucrose in 500 ml. of distilled water. (The latter dispersion is prepared by stirring the "Veegum" with the water at 50° C. until it is hydrated, about one-half hour, and then dissolving the sodium carboxymethyl cellulose and sucrose in the resultant dispersion.)

3,470,000 units of synthetic vitamin A palmitate are dissolved in 30 g. of the monostearate ester of a polyethylene glycol having an average molecular weight of about 1000 keeping the temperature in the neighborhood of about 45–50° C. 145 ml. of distilled water at 40° C. is added gradually with stirring to the vitamin A solution and the resultant solution added to the aqueous dispersion containing the vitamin C and other water soluble vitamins. 3750γ of crystalline vitamin $B_{12}$ in 4 ml. of distilled water is added gradually with stirring to the aqueous dispersion and the resultant dispersion diluted to a volume of 1000 ml. The product is then passed through a homogenizer at a pressure of 500 pounds per square inch and filled into bottles under nitrogen gas. The pH of the final preparation is 5.08. Each milliliter of this multivitamin dispersion has the following calculated composition:

| | |
|---|---|
| Vitamin $B_{12}$ | 3.75γ |
| Vitamin C mg | 32.5 |
| Water-swellable montmorillonite clay mg | 6.9 |
| Vitamin A (palmitate ester) units | 3470 |
| Thiamine hydrochloride mg | 2.25 |
| Riboflavin phosphate monosodium salt dihydrate mg | 1.73 |
| Nicotinamide mg | 11.5 |
| Pyridoxine hydrochloride mg | 0.57 |
| Sodium d-pantothenate mg | 3.7 |

To test the stability of the vitamin $B_{12}$ in the above preparation, a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal condition for a period of 1 year. When tested in this manner the above vitamin preparation was found to contain at the end of the heating period 3.3γ of vitamin $B_{12}$ per ml. The destruction of the vitamin $B_{12}$ was therefore 0.45γ per ml. or only 12%. This small percentage loss of activity is no greater than that normally experienced under similar conditions with aqueous solutions containing what are commonly considered to be the stable vitamins, e. g. thiamine, natural vitamin A esters, pantothenic acid, etc.

*Example 4*

An aqueous solution composed of 3.25 g. of vitamin C, 0.225 g. of thiamine hydrochloride, 0.488 g. of riboflavin-5'-phosphate ester monosodium salt dihydrate, 1.148 g. of nicotinamide, 0.375 g. of sodium d-pantothenate, 0.06 g. of pyridoxine hydrochloride, 0.06 g. of sodium saccharin, 1.0 g. of sodium benzoate and 2.84 ml. of 5 N sodium hydroxide in 75 ml. of distilled water is added under an atmosphere of nitrogen gas with stirring to an aqueous dispersion containing 1.2 g. of purified water-swellable hydrous magnesium-calcium-aluminum-silicate (Veegum), 2.24 g. of sodium carboxymethyl cellulose and 40 g. of sucrose in 75 ml. of distilled water. (The latter dispersion is prepared by stirring the "Veegum" with the water at 50° C. until it is hydrated, about one-half hour, and then dissolving the sodium carboxymethyl cellulose and sucrose in the resultant dispersion.)

0.75 ml. of an aqueous solution containing 500γ per milliliter of crystalline vitamin $B_{12}$ is added to the above vitamin dispersion under an atmosphere of nitrogen with stirring and the resultant dispersion diluted to a volume of 200 ml. with distilled water. Each milliliter of this final preparation has the following calculated composition:

| | |
|---|---|
| Vitamin $B_{12}$ | 1.87γ |
| Vitamin C mg | 16.25 |
| Water-swellable montmorillonite clay mg | 6.0 |
| Thiamine hydrochloride mg | 1.12 |
| Riboflavin phosphate monosodium salt dihydrate mg | 2.44 |
| Nicotinamide mg | 5.74 |
| Pyridoxine hydrochloride mg | 0.3 |
| Sodium d-pantothenate mg | 1.87 |

The final preparation is bottled under nitrogen and the bottles sealed. The stability of the vitamin $B_{12}$ in the composition is tested by heating a bottled sample at 45° C. for 500 hours and then determining its vitamin $B_{12}$ content by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period 1.55γ of vitamin $B_{12}$ per ml. The destruction of the vitamin $B_{12}$ was therefore 0.32γ per ml. or 17.4%. This percentage loss of activity is no greater than that normally experienced under similar conditions with aqueous solutions containing what are commonly considered to be the stable vitamins.

*Example 5*

337,400 units of synthetic vitamin A palmitate, 64,800 units of vitamin D (irradiated ergosterol in corn oil) and 0.26 ml. of oil of orange are dissolved in 3 g. of the monostearate ester of a polyethylene glycol having an average molecular weight of about 1000 keeping the temperature at about 45 to 50° C. The molten mass is diluted to a volume of 30 ml. with warm water and the resultant solution added with stirring to a dispersion containing 1.2 g. of a purified water-swellable hydrous magnesuim-calcium-aluminum-silicate (Veegum), 2.24 g. of sodium carboxymethyl cellulose and 40 g. of sucrose in 75 ml. of distilled water. An aqueous solution containing 3.25 g. of ascorbic acid, 1.0 g. of sodium benzoate and 0.06 g. of sodium saccharin and 2.84 ml. of 5 N sodium hydroxide solution in 50 ml. of distilled water is added with stirring under an atmosphere of nitrogen to the dispersion containing the vitamins A and D. 0.75 ml. of an aqueous solution containing 500γ per ml. of crystalline vitamin $B_{12}$ is added to the above vitamin dispersion and the resultant mixture diluted to a volume of 200 ml. with distilled water. Each milliliter of this multivitamin preparation has the following calculated composition:

| | |
|---|---|
| Vitamin $B_{12}$ | 1.87γ |
| Vitamin C mg | 16.25 |
| Water-swellable montmorillonite clay mg | 6.0 |
| Vitamin A (palmitate ester) units | 1687 |
| Vitamin D (irradiated ergosterol) do | 324 |

The final preparation is bottled under nitrogen and the bottles sealed. To test the stability of the vitamin $B_{12}$ in this preparation a bottled sample is heated at 45° C. for 500 hours and then the vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above preparation was found to contain at the end of the heating period 1.46γ of vitamin $B_{12}$ per milliliter. The destruction of the vitamin $B_{12}$ was therefore only 0.41γ per milliliter or 22%.

*Example 6*

336,000 units of synthetic vitamin A palmitate, 57,400 units of vitamin D (irradiated ergosterol in corn oil) and 0.26 ml. of oil of orange are dissolved in 3 g. of the monostearate ester of a polyethylene glycol having an average molecular weight of about 1000 keeping the temperature at about 45 to 50° C. Warm water is added gradually to the solution until the volume reaches 20 ml. The solution is added with stirring to a dispersion containing 1.2 g. of a purified water-swellable hydrous magnesium-calcium-aluminum-silicate (Veegum), 2.24 g. of sodium carboxymethyl cellulose and 40 g. of sucrose in 100 ml. of distilled water. A solution of 2.3 g. of nicotinamide in 20 ml of distilled water is added with stirring and then 0.75 ml. of a vitamin $B_{12}$ solution containing $500\gamma$ of vitamin $B_{12}$ per ml. is added.

1.63 g. of ascorbic acid is dissolved in 10 ml. of water under an atmosphere of nitrogen and the solution neutralized by the addition of 1.4 ml. of 5 N sodium hydroxide solution. The vitamin C solution is added with stirring to the aqueous dispersion containing the vitamin $B_{12}$ and the resultant dispersion diluted to a volume of 200 ml. with distilled water. The product is passed through a homogenizer at a pressure of 500 pounds per square inch, and filed into small bottles under nitrogen gas. Each milliliter of this multivitamin preparation has the following calculated composition:

Vitamin $B_{12}$ ------------------------------- $1.87\gamma$
Vitamin C ---------------------------mg-- 8.1
Water-swellable montmorillonite clay------mg-- 6.0
Vitamin A (palmitate ester)------------units-- 1680
Vitamin D (irradiated ergosterol)--------do---- 287
Nicotinamide ------------------------mg-- 11.5

To test the stability of the vitamin $B_{12}$ in the above preparation, a bottled sample is heated at 45° C. for 500 hours and then the vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above preparation was found to contain at the end of the heating period $1.64\gamma$ of vitamin $B_{12}$ per milliliter. The destruction of the vitamin $B_{12}$ was therefore only $0.23\gamma$ per ml. or 12.3%. This small percentage loss of activity is no greater than that normally experienced under normal conditions with aqueous solutions of many of the so-called stable vitamins, e. g. thiamine, pantothenic acid, natural vitamin A esters, etc.

*Example 7*

An aqueous solution composed of 0.226 g. of thiamine hydrochloride, 0.244 g. of riboflavin-5′-phosphate ester monosodium salt dihydrate, 0.058 g. of pyridoxine hydrochloride, 0.374 g. of sodium d-pantothenate, 1.15 g. of nicotinamide, 0.06 g. of sodium saccharin and 1 g. of sodium benzoate in 20 ml. of distilled water is added to a dispersion containing 1.2 g. of purified water-swellable hydrous magnesium-calcium-aluminum-silicate (Veegum), 2.24 g. of sodium carboxymethyl cellulose and 40 g. of sucrose in 100 ml. of distilled water.

336,000 units of synthetic vitamin A palmitate, 57,400 units of vitamin D (irradiated ergosterol in corn oil) and 0.26 ml. of oil of orange are dissolved in 3 g. of the monostearate ester of a polyethylene glycol having an average molecular weight of about 1000 keeping the temperature at 45° to 50° C. Warm distilled water is added gradually to the solution until the volume reaches 20 ml. The clear aqueous solution containing the vitamins A and D. is added slowly with stirring to the dispersion containing the water soluble B vitamins.

7.5 ml. of a vitamin $B_{12}$ solution containing $500\gamma$ of vitamin $B_{12}$ per ml. is added to the vitamin dispersion prepared above. A solution composed of 1.63 g. of vitamin C dissolved in 10 ml. of water and 1.4 ml. of 5 N sodium hydroxide solution is added to the vitamin dispersion with stirring under an atmosphere of nitrogen. The aqueous vitamin concentrate is diluted to a volume of 200 ml. with distilled water, passed through a homogenizer at 500 pounds per square inch pressure and filled into small bottles under an atmosphere of nitrogen. Each milliliter of this multivitamin preparation has the following calculated composition:

Vitamin $B_{12}$ -------------------------------- $18.75\gamma$
Vitamin C ---------------------------mg-- 16.25
Water-swellable montmorillonite clay------mg-- 6.0
Vitamin A (palmitate ester)------------units-- 1680
Vitamin D (irradiated ergosterol)--------do---- 287
Thiamine hydrochloride-----------------mg-- 1.12
Riboflavin phosphate monosodium salt dihydrate ---------------------------mg-- 1.22
Nicotinamide -------------------------mg-- 5.75
Pyridoxine hydrochloride----------------mg-- 0.29
Sodium d-pantothenate------------------mg-- 1.88

To test the stability of the vitamin $B_{12}$ in the above preparation a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period $13.5\gamma$ of vitamin $B_{12}$ per ml. The destruction of the vitamin $B_{12}$ was therefore $5.25\gamma$ per ml. or 28%. This percentage loss of activity while it appears high is no greater than that experienced in many instances under similar conditions with aqueous solutions containing many of the so-called stable vitamins. Moreover it is customary in the pharmaceutical industry to add quite large excesses, for instance 25% or more, of the vitamins to compensate for losses in activity during storage of the aqueous solutions.

*Example 8*

An aqueous solution composed of 307.58 g. of vitamin C, 21.29 g. of thiamine hydrochloride, 108.84 g. of nicotinamide, 5.44 g. of pyridoxine hydrochloride, 35.49 g. of sodium d-pantothenate, 23.09 g. of riboflavin-5′-phosphate ester monosodium salt dihydrate, 5.162 g. of sodium saccharin, 94.64 g. of sodium benzoate and 53.755 g. of sodium hydroxide in 1750 ml. of distilled water is added under an atmosphere of nitrogen gas with stirring to an aqueous dispersion containing 170.36 g. of purified water-swellable hydrous magnesium-calcium-aluminum silicate (Veegum), 212.10 g. of sodium carboxymethyl cellulose and 3785.6 g. of sucrose in 11 liters of distilled water. (The "Veegum" dispersion is prepared as described in Example 1.)

31,941,000 units of synthetic vitamin A palmitate, 5,441,800 units of vitamin D (irradiated ergosterol in corn oil) and 24.5 ml. of oil of orange are dissolved in 283.92 g. of the monostearate ester of a polyethylene glycol having an average molecular weight of about 1000 keeping the temperature in the neighborhood of 45–50° C. 2700 ml. of distilled water at 40° C. is added gradually with stirring to the solutions of the vitamins A and D. The resultant solution is then added with stirring in a nitrogen atmosphere to the aqueous dispersion containing the vitamin C and other water soluble vitamins. 0.036 g. of crystalline vitamin $B_{12}$ in 100 ml. of distilled water is added to the dispersion with stirring under nitrogen and the mixture diluted to a volume of 18,928 ml. with distilled water to obtain the desired multivitamin preparation. The pH of the dispersion is 5. Each milliliter of this final preparation has the following calculated composition:

Vitamin $B_{12}$ -------------------------------- $1.9\gamma$
Vitamin C ---------------------------mg-- 16.25
Water-swellable montmorillonite clay------mg-- 9.0
Vitamin A (palmitate ester)------------units-- 1687
Vitamin D (irradiated ergosterol)--------do---- 288

| | |
|---|---|
| Thiamine hydrochloride mg | 1.12 |
| Riboflavin phosphate monosodium salt dihydrate mg | 1.22 |
| Nicotinamide mg | 5.75 |
| Pyridoxine hydrochloride mg | 0.29 |
| Sodium d-pantothenate mg | 1.88 |

The final preparation is bottled under nitrogen and the bottles sealed. The yield is about 40 pints of the desired multivitamin dispersion.

To test the stability of the vitamin $B_{12}$ in the above preparation a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period $1.78\gamma$ of vitamin $B_{12}$ per ml. The destruction of the vitamin $B_{12}$ was therefore $0.12\gamma$ per ml. or 6.3%.

*Example 9*

16.25 g. of vitamin C is dissolved in 100 ml. of distilled water and 14.2 ml. of 5 N sodium hydroxide added to the solution slowly with stirring under an atmosphere of nitrogen. The vitamin C solution is added to an aqueous dispersion containing 3 g. of purified water-swellable hydrous magnesium-calcium-aluminum-silicate (Veegum), 18 g. of sodium carboxymethyl cellulose and 200 g. of sucrose in 550 ml. of distilled water. (The latter dispersion is prepared as described in Example 1.)

A solution containing 1.12 g. of thiamine hydrochloride, 0.29 g. of pyridoxine hydrochloride, 1.88 g. of sodium d-pantothenate, 5.75 g. of nicotinamide, 1.22 g. of riboflavin-5'-phosphate ester monosodium salt dihydrate, 5 g. of sodium benzoate and 0.6 g. of sodium saccharin in 50 ml. of distilled water is added with stirring under an atmosphere of nitrogen to the dispersion containing the vitamin C.

1,687,000 units of synthetic vitamin A palmitate, 284,000 units of vitamin D (irradiated ergosterol in corn oil) and 1.3 ml. of oil of orange are dissolved in 15 g. of the monostearate ester of a polyethylene glycol having an average molecular weight of about 1000 keeping the temperature in the neighborhood of 45–50° C. 160 ml. of warm distilled water is added to the solution containing the vitamins A and D and the resultant solution added to the main vitamin dispersion with stirring under an atmosphere of nitrogen.

3.4 ml. of an aqueous solution containing $500\gamma$ per ml. of crystalline vitamin $B_{12}$ is added to the vitamin dispersion with stirring under nitrogen and the resultant dispersion diluted to a volume of 1000 ml. The final preparation is bottled and sealed under nitrogen. Each milliliter of this final preparation has the following calculated composition:

| | |
|---|---|
| Vitamin $B_{12}$ | $1.7\gamma$ |
| Vitamin C mg | 16.25 |
| Water-swelling montmorillonite clay mg | 3.0 |
| Vitamin A (palmitate ester) units | 1687 |
| Vitamin D (irradiated ergosterol) do | 284 |
| Thiamine hydrochloride mg | 1.12 |
| Riboflavin phosphate monosodium salt dihydrate mg | 1.22 |
| Nicotinamide mg | 5.75 |
| Pyridoxine hydrochloride mg | 0.29 |
| Sodium d-pantothenate mg | 1.88 |

To test the stability of the vitamin $B_{12}$ in the above preparation a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period $1.28\gamma$ of vitamin $B_{12}$ per ml. The destruction of the vitamin $B_{12}$ was therefore $0.42\gamma$ per ml. or 24.7%. This percentage loss of activity while it appears high is no greater than that experienced in many instances under similar conditions with aqueous solutions containing many of the so-called stable vitamins. Moreover it is customary in the pharmaceutical industry to add quite large excesses, for instance 25% or more, of the vitamins to compensate for losses in activity during storage of the aqueous solutions.

*Example 10*

An aqueous solution composed of 3.25 g. of vitamin C, 0.225 g. of thiamine hydrochloride, 1.148 g. of nicotinamide, 0.06 g. of pyridoxine hydrochloride, 0.375 g. of sodium d-pantothenate, 0.488 g. of riboflavin-5'-phosphate ester monosodium salt dihydrate, 0.06 g. of sodium saccharin, 1.0 g. of sodium benzoate, and 2.84 ml. of 5 N sodium hydroxide solution in 75 ml. of distilled water is added under an atmosphere of nitrogen gas with stirring to an aqueous dispersion containing 1.2 g. of a purified water-swellable hectorite (Dutch Boy Thix), 2.24 g. of sodium carboxymethyl cellulose and 40 g. of sucrose in 75 ml. of distilled water.

337,400 units of synthetic vitamin A palmitate, 64,800 units of vitamin D (irradiated ergosterol in corn oil) and 0.26 ml. of oil of orange are dissolved in 3 g. of the monostearate ester of a polyethylene glycol having an average molecular weight of about 1000 keeping the temperature in the neighborhood of 45–50° C. Sufficient warm water is added to the solution of the vitamins A and D to bring the volume to 25 ml. and the solution added to the aqueous dispersion containing the vitamin C.

0.75 ml. of an aqueous solution containing $500\gamma$ of crystalline vitamin $B_{12}$ per ml. is added to the main vitamin dispersion with stirring under an atmosphere of nitrogen, and the resulting dispersion diluted to a volume of 200 ml. with distilled water. Each milliliter of this final preparation has the following calculated composition:

| | |
|---|---|
| Vitamin $B_{12}$ | $1.87\gamma$ |
| Vitamin C mg | 16.25 |
| Water-swellable montmorillonite clay mg | 6.0 |
| Vitamin A (palmitate ester) units | 1687 |
| Vitamin D (irradiated ergosterol) do | 324 |
| Thiamine hydrochloride mg | 1.12 |
| Riboflavin phosphate monosodium salt dihydrate mg | 2.44 |
| Nicotinamide mg | 5.75 |
| Pyridoxine hydrochloride mg | 0.3 |
| Sodium d-pantothenate mg | 1.87 |

The final preparation is bottled under nitrogen and the bottles sealed.

To test the stability of the vitamin $B_{12}$ in the above preparation a bottled sample is heated at 45° C. for 500 hours and then its vitamin $B_{12}$ content determined by the standard microbiological method described in the United States Pharmacopoeia. The heating of the vitamin dispersion at 45° C. for 500 hours is equivalent to storing the product under normal conditions for a period of one year. When tested in this manner the above vitamin preparation was found to contain at the end of the heating period $1.41\gamma$ of vitamin $B_{12}$ per milliliter. The destruction of the vitamin $B_{12}$ was therefore $0.46\gamma$ per milliliter or 24.6%.

I claim:

1. An aqueous multivitamin dispersion comprising water, vitamin $B_{12}$, vitamin C, a water-swellable montmorillonite clay and at least one member of the class consisting of (1) vitamins A and D and (2) thiamine and riboflavin.

2. An aqueous multivitamin dispersion comprising water, 0.2 to 25 gamma per milliliter of vitamin $B_{12}$, 6 to 32.5 milligrams per milliliter of vitamin C, 4 to 30 milligrams per milliliter of a water-swellable montmorillonite clay and at least one member of the class consisting of (1) vitamins A and D and (2) thiamine and riboflavin, the amount of vitamin A being 500 to 4000 units per milliliter, the amount of vitamin D being 100 to 6000 units per milliliter, the amount of thiamine being 0.2 to 2.5 milligrams per milliliter and the amount of riboflavin being 0.2 to 2 milligrams per milliliter.

3. An aqueous multi-vitamin dispersion comprising water, 0.2 to 4.0 gamma per milliliter of vitamin $B_{12}$, 6 to 20 milligrams per milliliter of vitamin C, 5 to 8 milligrams per milliliter of a water-swellable montmorillonite clay and at least one member of the class consisting of (1) vitamins A and D and (2) thiamine and riboflavin, the amount of vitamin A being 600 to 2000 units per milliliter, the amount of vitamin D being 150 to 350 units per milliliter, the amount of thiamine being 0.2 to 1.5 milligrams per milliliter and the amount of riboflavin being 0.2 to 1.5 milligrams per milliliter.

4. An aqueous multi-vitamin dispersion comprising water, 0.2 to 25 gamma per milliliter of vitamin $B_{12}$, 6 to 32.5 milligrams per milliliter of vitamin C, 4 to 30 milligrams per milliliter of a water-swellable hydrous calcium-magnesium-aluminum-silicate, 500 to 4000 units per milliliter of vitamin A and 100 to 6000 units per milliliter of vitamin D.

5. An aqueous multivitamin dispersion comprising water, 0.2 to 4.0 gamma per milliliter of vitamin $B_{12}$, 6 to 20 milligrams per milliliter of vitamin C, 5 to 8 milligrams per milliliter of a water-swellable hydrous calcium-magnesium-aluminum-silicate, 600 to 2000 units per milliliter of vitamin A, 150 to 350 units per milliliter of vitamin D, 0.2 to 1.5 milligrams per milliliter of thiamine and 0.2 to 1.5 milligrams per milliliter of riboflavin.

6. An aqueous multivitamin dispersion comprising water, 0.2 to 4.0 gamma per milliliter of vitamin $B_{12}$, 6 to 20 milligrams of vitamin C, 5 to 8 milligrams per milliliter of a water-swellable hydrous calcium-magnesium-aluminum-silicate, 600 to 2000 units per milliliter of a fatty acid ester of vitamin A alcohol, 150 to 350 units per milliliter of vitamin D, 0.2 to 1.5 milligrams per milliliter of thiamine hydrochloride, 0.2 to 1.5 milligrams per milliliter of riboflavin-5'-phosphate ester monosodium salt dihydrate, up to 12 milligrams per milliliter of nicotinamide, up to 0.6 milligrams per milliliter of pyridoxine hydrochloride and up to 3 milligrams per milliliter of an alkali metal salt of pantothenic acid, said solution having a pH between 4.7 and 6.0.

7. An aqueous multivitamin dispersion comprising water, 0.2 to 4.0 gamma per milliliter of vitamin $B_{12}$, 6 to 20 milligrams per milliliter of vitamin C, 5 to 8 milligrams per milliliter of a water-swellable hydrous calcium-magnesium-aluminum-silicate, 600 to 2000 units per milliliter of a fatty acid ester of vitamin A alcohol and 150 to 350 units per milliliter of vitamin D.

8. An aqueous multivitamin dispersion comprising water, 0.2 to 4.0 gamma per milliliter of vitamin $B_{12}$, 6 to 20 milligrams per milliliter of vitamin C, 5 to 8 milligrams per milliliter of a water-swellable hydrous calcium-magnesium-aluminum-silicate, 0.2 to 1.5 milligrams per milliliter of thiamine hydrochloride, 0.2 to 1.5 milligrams per milliliter of riboflavin-5'-phosphate ester monosodium salt dihydrate, up to 12 milligrams per milliliter of nicotinamide, up to 0.6 milligrams per milliliter of pyridoxine hydrochloride and up to 3 milligrams per milliliter of an alkali metal salt of pantothenic acid, said solution having a pH between 4.7 and 6.0.

9. An aqueous multi-vitamin dispersion comprising water, 0.2 to 25 gamma per milliliter of vitamin $B_{12}$, 6 to 32.5 milligrams per milliliter of vitamin C, 4 to 30 milligrams per milliliter of a water-swellable hectorite, 500 to 4000 units per milliliter of vitamin A and 100 to 6000 units per milliliter of vitamin D.

10. An aqueous multi-vitamin dispersion comprising water, 0.2 to 4.0 gamma per milliliter of vitamin $B_{12}$, 6 to 20 milligrams per milliliter of vitamin C, 5 to 8 milligrams per milliliter of a water-swellable hectorite, 600 to 2000 units per milliliter of vitamin A, 150 to 350 units per milliliter of vitamin D, 0.2 to 1.5 milligrams per milliliter of thiamine and 0.2 to 1.5 milligrams per milliliter of riboflavin.

11. An aqueous multivitamin dispersion comprising water, 0.2 to 4.0 gamma per milliliter of vitamin $B_{12}$, 6 to 20 milligrams of vitamin C, 5 to 8 milligrams per milliliter of a water-swellable hydrous hectorite, 600 to 2000 units per milliliter of a fatty acid ester of vitamin A alcohol, 150 to 350 units per milliliter of vitamin D, 0.2 to 1.5 milligrams per milliliter of thiamine hydrochloride, 0.2 to 1.5 milligrams per milliliter of riboflavin-5'-phosphate ester monosodium salt dihydrate, up to 12 milligrams per milliliter of nicotinamide, up to 0.6 milligrams per milliliter of pyridoxine hydrochloride and up to 3 milligrams per milliliter of an alkali metal salt of pantothenic acid, said solution having a pH between 4.7 and 6.0.

12. An aqueous multi-vitamin dispersion according to claim 1 in which the water-swellable montmorillonite clay is a water-swellable hydrous calcium-magnesium-aluminum-silicate.

13. An aqueous multi-vitamin dispersion according to claim 1 in which the water-swellable montmorillonite clay is a water-swellable hectorite.

14. An aqueous multi-vitamin dispersion comprising water, vitamin $B_{12}$, vitamin C, a water-swellable montmorillonite clay, vitamin A, vitamin D, thiamine and riboflavin.

15. An aqueous multi-vitamin dispersion comprising water, 0.2 to 25 gamma per milliliter of vitamin $B_{12}$, 6 to 32.5 milligrams per milliliter of vitamin C, 4 to 30 milligrams per milliliter of a water-swellable hydrous calcium-magnesium-aluminum-silicate, 0.2 to 2.5 milligrams per milliliter of thiamine and 0.2 to 2 milligrams per milliliter of riboflavin.

16. An aqueous multi-vitamin dispersion comprising water, 0.2 to 25 gamma per milliliter of vitamin $B_{12}$, 6 to 32.5 milligrams per milliliter of vitamin C, 4 to 30 milligrams per milliliter of a water-swellable hectorite, 0.2 to 2.5 milligrams per milliliter of thiamine and 0.2 to 2 milligrams per milliliter of riboflavin.

17. A process for stabilizing vitamin $B_{12}$ which comprises adsorbing vitamin $B_{12}$ on a hydrous aluminum silicate and mixing the adsorbate with vitamin C in an aqueous medium, said aqueous medium having a pH of about 5.0.

18. An aqueous composition having a pH of about 5.0 comprising vitamin C and vitamin $B_{12}$, said vitamin $B_{12}$ being adsorbed on a hydrous aluminum silicate.

19. A process for obtaining stable aqueous vitamin compositions which comprises mixing an aqueous suspension containing vitamin $B_{12}$ and a hydrous aluminum silicate with an aqueous solution of vitamin C to provide a mixture having a pH of about 5.

20. An aqueous composition having a pH of about 5 comprising a hydrous aluminum silicate, vitamin C and vitamin $B_{12}$, said vitamin $B_{12}$ being associated with said hydrous aluminum silicate.

21. An aqueous composition having a pH of about 5 comprising a hydrous aluminum silicate, vitamin A, vitamin C, vitamin D, thiamine, riboflavin, and vitamin $B_{12}$, said vitamin $B_{12}$ being associated with said hydrous aluminum silicate.

References Cited in the file of this patent

UNITED STATES PATENTS

| | | |
|---|---|---|
| 2,530,416 | Wolf | Nov. 21, 1950 |
| 2,626,888 | Kutosh | Jan. 27, 1953 |
| 2,662,048 | Winsten | Dec. 8, 1953 |